United States Patent
Shinn et al.

(10) Patent No.: US 9,863,249 B2
(45) Date of Patent: Jan. 9, 2018

(54) PRE-SINTERED PREFORM REPAIR OF TURBINE BLADES

(71) Applicants: Brandon W. Shinn, Houston, TX (US); Atul L. Navale, Houston, TX (US); James A. Yarbrough, Spring, TX (US)

(72) Inventors: Brandon W. Shinn, Houston, TX (US); Atul L. Navale, Houston, TX (US); James A. Yarbrough, Spring, TX (US)

(73) Assignee: SIEMENS ENERGY, INC., Orlando, FL (US)

( * ) Notice: Subject to any disclaimer, the term of this patent is extended or adjusted under 35 U.S.C. 154(b) by 1222 days.

(21) Appl. No.: 13/693,091

(22) Filed: Dec. 4, 2012

(65) Prior Publication Data

US 2014/0154082 A1    Jun. 5, 2014

(51) Int. Cl.
| | | |
|---|---|---|
| F01D 5/00 | (2006.01) | |
| F01D 5/22 | (2006.01) | |
| B23K 1/00 | (2006.01) | |
| B23P 6/00 | (2006.01) | |
| B23K 1/20 | (2006.01) | |
| B23K 101/00 | (2006.01) | |

(52) U.S. Cl.
CPC ............ *F01D 5/005* (2013.01); *B23K 1/0018* (2013.01); *B23K 1/20* (2013.01); *B23P 6/005* (2013.01); *F01D 5/225* (2013.01); *B23K 2201/001* (2013.01); *Y10T 29/49318* (2015.01)

(58) Field of Classification Search
CPC .. B23K 1/0018; B23K 1/20; B23K 2201/001; B23P 6/002; B23P 6/005; F01D 5/225; Y10T 29/49318

See application file for complete search history.

(56) References Cited

U.S. PATENT DOCUMENTS

| | | | |
|---|---|---|---|
| 4,155,152 A | 5/1979 | Cretella et al. | |
| 4,726,101 A | 2/1988 | Draghi et al. | |
| 6,241,471 B1 | 6/2001 | Herron | |
| 6,805,530 B1 | 10/2004 | Urban | |
| 8,192,166 B2 | 6/2012 | Beeck et al. | |
| 2002/0148115 A1* | 10/2002 | Burke | B23P 6/005 29/889.1 |
| 2006/0097719 A1 | 5/2006 | Moore | |
| 2006/0134454 A1* | 6/2006 | Sathian | B22F 1/0003 428/668 |
| 2006/0277753 A1* | 12/2006 | Ntsama-Etoundi | B23P 6/005 29/889.1 |
| 2008/0145228 A1 | 6/2008 | Truckenmueller et al. | |

(Continued)

FOREIGN PATENT DOCUMENTS

| | | |
|---|---|---|
| DE | 102009036405 A1 | 2/2011 |
| EP | 0999009 A1 | 5/2000 |

(Continued)

OTHER PUBLICATIONS

Brazing, Second Edition; (second printing, Feb. 2004); pp. 54-56; Mel M. Schwartz ISBN: 0-87170-784-5.

*Primary Examiner* — Moshe Wilensky

(57) ABSTRACT

A process is provided for repairing a damaged portion of a gas turbine blade comprising: providing a preform comprising a low-melt alloy material and a base alloy material; locating the preform on the gas turbine engine blade damaged portion; and heat treating the preform and the blade such that the preform is brazed to the blade.

14 Claims, 4 Drawing Sheets

(56) References Cited

U.S. PATENT DOCUMENTS

| | | |
|---|---|---|
| 2008/0206057 A1 | 8/2008 | Twerdochlib |
| 2009/0229101 A1* | 9/2009 | Ahmad ................ B23K 1/0018 29/402.18 |
| 2010/0008816 A1 | 1/2010 | Hu |
| 2011/0099810 A1* | 5/2011 | Stankowski ............ B22F 7/062 29/888 |
| 2012/0051934 A1* | 3/2012 | Allen ........................ C25D 7/10 416/229 R |
| 2012/0198676 A1* | 8/2012 | Rickenbacher ......... B23P 6/005 29/402.13 |
| 2012/0317809 A1* | 12/2012 | Brown .................... F01D 5/005 29/889.1 |
| 2013/0020377 A1* | 1/2013 | Stankowski ......... B23K 1/0018 228/119 |
| 2014/0366996 A1* | 12/2014 | Goncharov ............ B23K 1/005 148/528 |

FOREIGN PATENT DOCUMENTS

| | | |
|---|---|---|
| EP | 1674658 A1 | 12/2005 |
| EP | 1721699 A1 | 11/2006 |
| EP | 1837104 A2 | 3/2007 |
| EP | 1982781 A1 | 10/2008 |

* cited by examiner

PRE-SINTERED PREFORM REPAIR OF TURBINE BLADES

FIELD OF THE INVENTION

The present disclosure relates to a process for repairing a worn and damaged section of a gas turbine engine blade by brazing a pre-sintered preform to the damaged section.

BACKGROUND OF THE INVENTION

There are a series of rows of stationary vanes and rotating blades in a turbine section of a gas turbine engine. The blades are coupled to a rotor disc assembly.

Hot working gases travel to the rows of blades. As the working gases expand through the turbine, the working gases cause the blades and, hence, the rotor disc assembly to rotate.

One type of gas turbine blade comprises a tip shroud coupled to an airfoil upper end. The tip shroud interlocks with adjacent blade tip shrouds at contact surfaces so as to reduce vibration and prevent the hot gases from passing over the airfoil upper end of each blade. During start-up and shut-down cycles of the gas turbine engine, the contact surfaces are displaced, and become worn and damaged. In the past, to repair the worn, displaced and damaged tip shroud contact surfaces, filler material was welded to the contact surfaces, heat treated and then machined. The heat treatment operation sometimes resulted in cracks being formed at least in a base or original portion of the tip shroud.

SUMMARY OF THE INVENTION

In accordance with a first aspect of the present disclosure, a process is provided for repairing a damaged portion of a gas turbine blade comprising: providing a preform comprising a low-melt alloy material and a base alloy material; locating the preform on the gas turbine engine blade damaged portion; and heat treating the preform and the blade such that the preform is brazed to the blade.

The base alloy material may be the substantially same material as the material from which the blade is formed.

The preform may comprise about 70 to about 80% by weight base alloy material and about 30 to about 20% by weight low-melt alloy material based on the total weight of the preform prior to heat treating.

Prior to heat treating, the process may further comprise spot-welding the preform to the blade.

Prior to heat treating, the process may further comprise resistance welding the preform to the blade.

The blade damaged portion may comprise a tip shroud contact surface.

The process may further comprise grinding the damaged portion prior to locating the preform on the damaged portion.

The process may further comprise machining the preform and the blade after heat treating.

The process may further comprise adding a braze material to the blade damaged portion prior to locating the preform on the damaged portion.

In accordance with a second aspect of the present disclosure, a process is provided for repairing a damaged contact surface of a tip shroud of a gas turbine blade comprising: providing a preform comprising a low-melt alloy material and a base alloy material; locating the preform on the tip shroud contact surface; and heat treating the preform and the tip shroud such that the preform is brazed to the tip shroud.

The base alloy material may be substantially the same material from which the tip shroud is formed.

The preform may comprise about 70 to about 80% by weight base alloy material and about 30 to about 20% by weight low-melt alloy material based on the total weight of the preform prior to welding and heat treating.

Prior to heat treating, the process may further comprise spot-welding the preform to the blade.

Prior to heat treating, the process may further comprise resistance welding the preform to the blade.

The process may further comprise grinding the damaged section prior to locating the preform on the contact surface.

The process may further comprise adding a braze material to the tip shroud contact surface prior to locating the preform on the contact surface.

Heat treating may comprise a low-melt or braze heat treatment.

After heat treating, the process may further comprise welding filler material to the preform.

In accordance with a third aspect of the present disclosure, a turbine blade is provided comprising: an airfoil comprising upper and lower ends; a root coupled to the airfoil lower end, the root adapted to couple the blade to a rotatable disk; a tip shroud coupled to the airfoil upper end, the tip shroud having first and second spaced-apart contact surfaces; and a preform coupled to one of the tip shroud contact surfaces.

The preform may be brazed to the tip shroud contact surface.

BRIEF DESCRIPTION OF THE DRAWINGS

While the specification concludes with claims particularly pointing out and distinctly claiming the present disclosure, it is believed that the present disclosure will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the disclosure may be practiced. It is to be understood that other embodiments may be utilized and that changes may be made without departing from the spirit and scope of the present disclosure.

In a turbine section of a gas turbine engine, there are a series of rows of stationary vanes and rotating blades, typically four rows of vanes and four rows of blades. The blades are coupled to a rotor disc assembly. Hot working gases travel to the rows of blades. As the working gases expand through the turbine, the working gases cause the blades and, hence, the rotor disc assembly to rotate.

Figure 1:
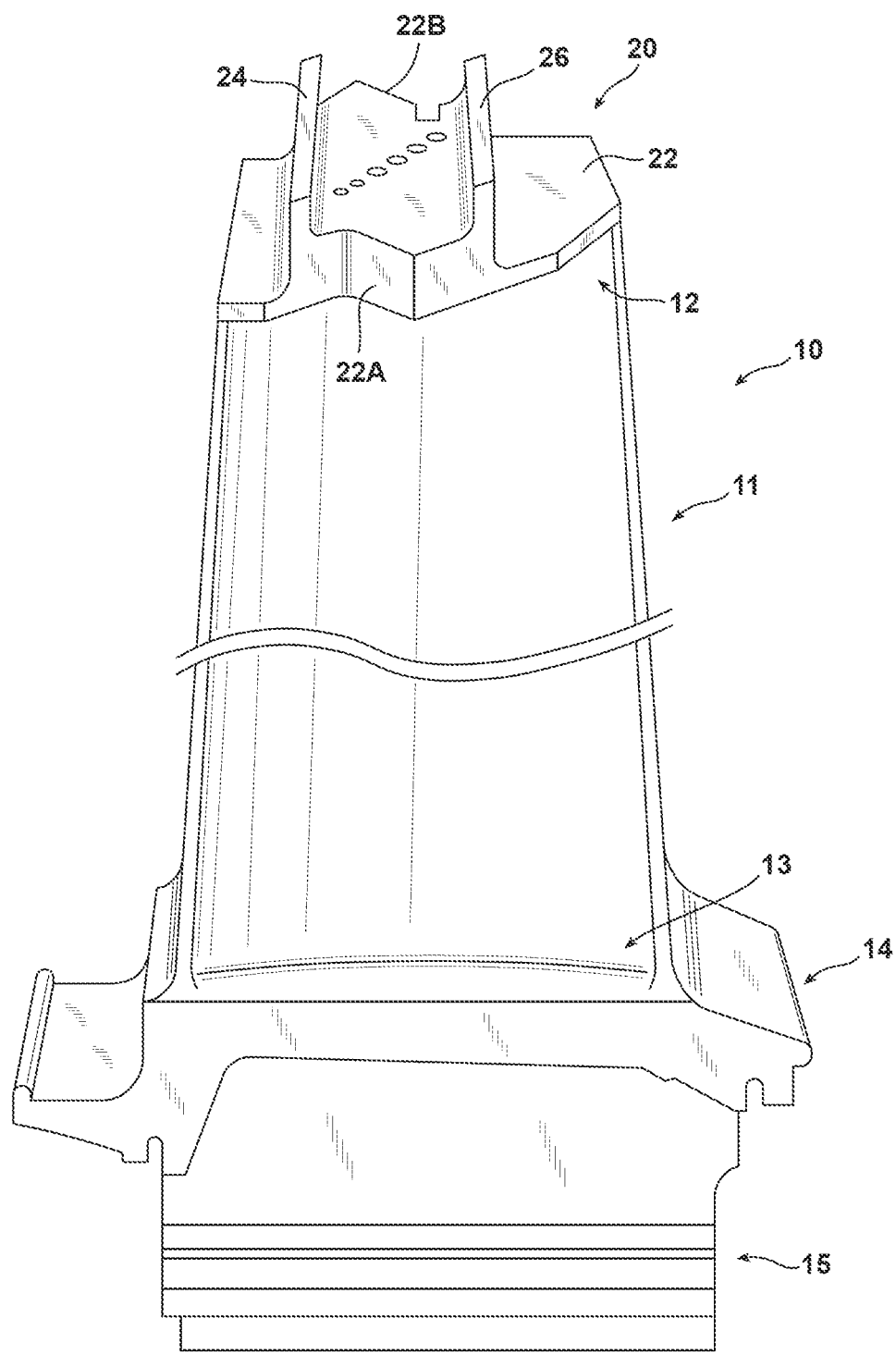
FIG. 1 is a perspective view of a gas turbine blade having contact surfaces, which may be repaired in accordance with the present disclosure.
Figure 2:
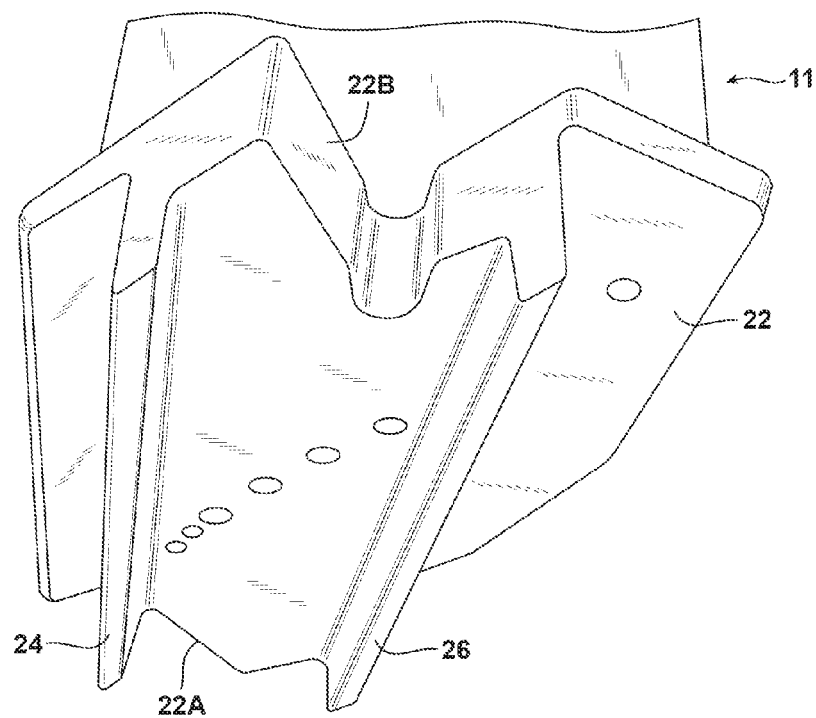
FIG. 2 is an enlarged view of a tip shroud of the blade illustrated in FIG. 1.

One type of gas turbine blade 10 is illustrated in FIG. 1, which may comprise a third or a fourth row blade. The turbine blade 10 comprises an airfoil 11 including an upper end 12 and a lower end 13. A platform 14 is coupled to the airfoil lower end 13. A root 15 extends from the platform 14 and couples the blade 10 to the rotor disc assembly (not shown). The blade 10 further comprises a tip shroud 20 coupled to the airfoil upper end 12. In the illustrated embodiment, the airfoil 11, platform 14, root 15 and tip shroud 20 comprise an integral unit formed from a superalloy material, such as a Ni-base superalloy.

The tip shroud 20 comprises a base portion 22 and first and second radially extending sealing rails 24 and 26. The sealing rails 24 and 26 extend in a direction opposite the airfoil 11. The base portion 22 of the tip shroud 20 comprises first and second spaced apart contact surfaces 22A and 22B. The first contact surface 22A engages an adjacent contact surface of a tip shroud base portion of a first adjacent turbine blade (not shown) and the second contact surface 22B engages an adjacent contact surface of a tip shroud base portion of a second adjacent turbine blade (not shown). The first and second adjacent turbine blades are located on opposing sides of the turbine blade 10. The first and second contact surfaces 22A and 22B engage with adjacent tip shroud contact surfaces, as do all the contact surfaces of all of the blades positioned circumferentially about the rotor disc assembly and defining a row of blades. Hence, each tip shroud of each blade within the row of blades interlocks with adjacent blade tip shrouds at contact surfaces so as to reduce vibration and prevent the hot working gases from passing over the airfoil upper ends of the blades. However, during operation of the gas turbine engine, especially during start-up and shut-down cycles, the contact surfaces are displaced, and become worn and damaged.

As noted above, to repair worn, displaced and damaged tip shroud contact surfaces in the past, filler material was welded to the contact surfaces, heat treated and then machined. The heat treatment operation sometimes resulted in cracks being formed at least in the base portion of the tip shroud.

In accordance with the present disclosure, a process is provided for repairing one or more damaged contact surfaces, such as contact surfaces 22A and 22B of the tip shroud 20 of the gas turbine blade 10, such that the likelihood of formation of cracks in the base portion 22 is reduced.

Initially, the process involves grinding the contact surfaces 22A and 22B of the base portion 22 using a conventional grinding wheel so as to remove existing erosion material and make smooth the contact surfaces 22A and 22B.

After grinding, the contact surfaces 22A and 22B are inspected and cleaned to remove any remaining loose material as well as coolant used during the grinding operation.

A pre-sintered preform 30 is provided for each contact surface 22A and 22B to be repaired. The pre-sintered preform 30, in the illustrated embodiment, comprises a low-melt alloy material and a base alloy material. For example, the low-melt alloy material may comprise a low-melt Ni-base superalloy, one of which is commercially available from Praxair Surface Technologies, Indianapolis, Ind., under the product name "Ni-377-1." It is believed that the low-melt superalloy Ni-377-1 comprises approximately 14% by volume Cr, 9% by volume Co, 4% by volume Al, 2.5% by volume B, with substantially the balance comprising Ni. It is believed that very small amounts of other elements are included in Ni-377-1. The base alloy material may comprise a Ni-base superalloy, one of which is commercially available from Praxair Surface Technologies, Indianapolis, IN, under the product name "Ni-335-5." It is believed that the Ni-base superalloy Ni-335-5 comprises approximately 10% by volume Co, 10% by volume W, 8.25% by volume Cr, 5.5% by volume Al, 3.0% by volume Ta; 1.5% by volume Hf; 1.0% by volume Ti; 0.7% by volume Mo; 0.15% by volume C; 0.05% by volume Zr; 0.015% by volume B, with substantially the balance comprising Ni. It is believed that very small amounts of other elements are included in Ni-335-5. It is noted that the base alloy material in the preforms 30 is preferably the same or nearly the same superalloy material used to form the blade 10, including the base portion 22 of the tip shroud 20. Hence, the base alloy material may have substantially the same solidus temperature and liquidus temperature as the material defining the blade 10. The low-melt alloy material Ni-377-1 has a solidus temperature $T_S$ and a liquidus temperature $T_L$ lower than that of the base alloy material, see FIG. 4.

The preform 30 may comprise about 70% to about 80% by weight base alloy material and about 30% to about 20% by weight low-melt alloy material based on the total weight of the preform 30 prior to welding and heat treating. Preferably, the preform 30 comprises 75% by weight base alloy material and 25% by weight low-melt alloy material based on the total weight of the preform 30. The materials and weight percentages set out above are provided as examples only and the materials and weight percentages may be varied. An example pre-sintered preform 30 comprising 75% by weight Ni-335-5 (as noted above, this material is commercially available from Praxair Surface Technologies, Indianapolis, Ind.) and 25% by weight Ni-377-1 (as noted above, this material is commercially available from Praxair Surface Technologies, Indianapolis, Ind.) is commercially available from AIM MRO, LLC, Cincinnati, Ohio, under the product designation "MarM247/BRB 75-25 preform."

Figure 3:
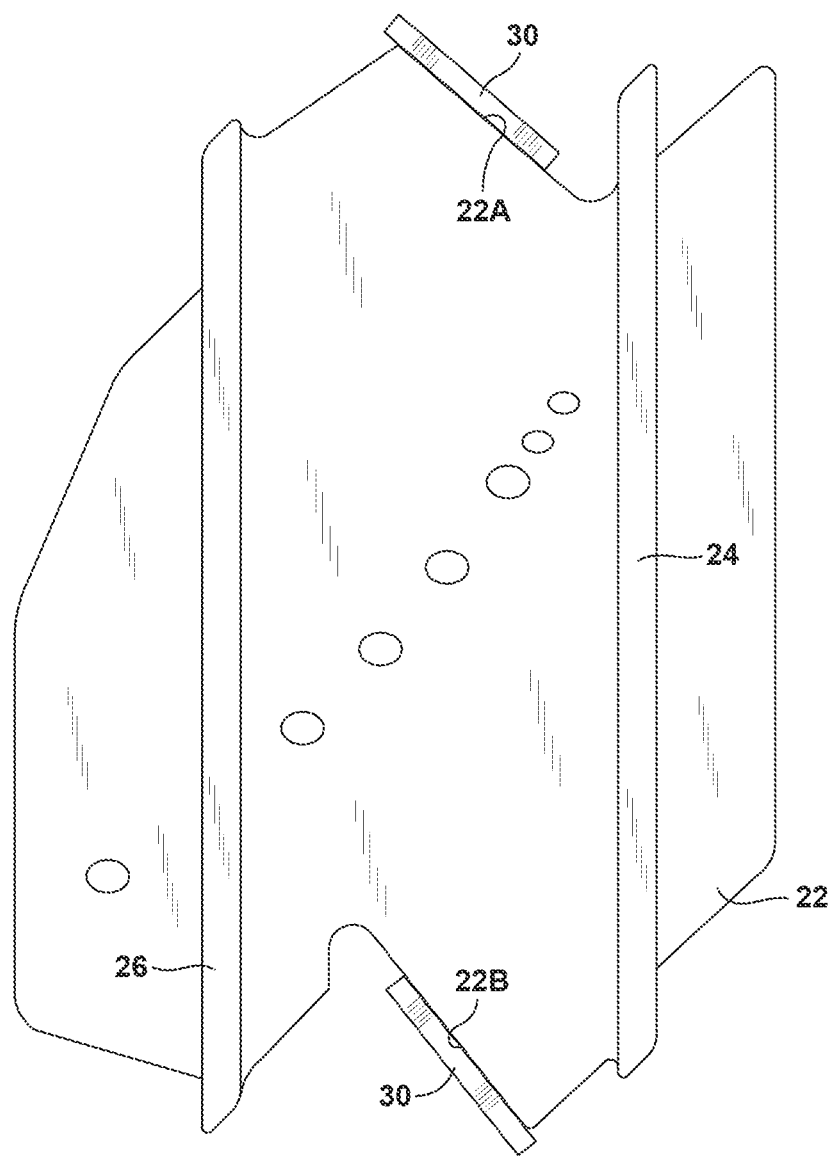
FIG. 3 is an enlarged view of the tip shroud including preforms coupled to contact surfaces of the tip shroud base portion.

A preform 30 is spot-welded to each of the contact surfaces 22A and 22B, presuming both are worn and in need of repair, via a conventional resistance welding or like process, see FIG. 3.

Figure 4:
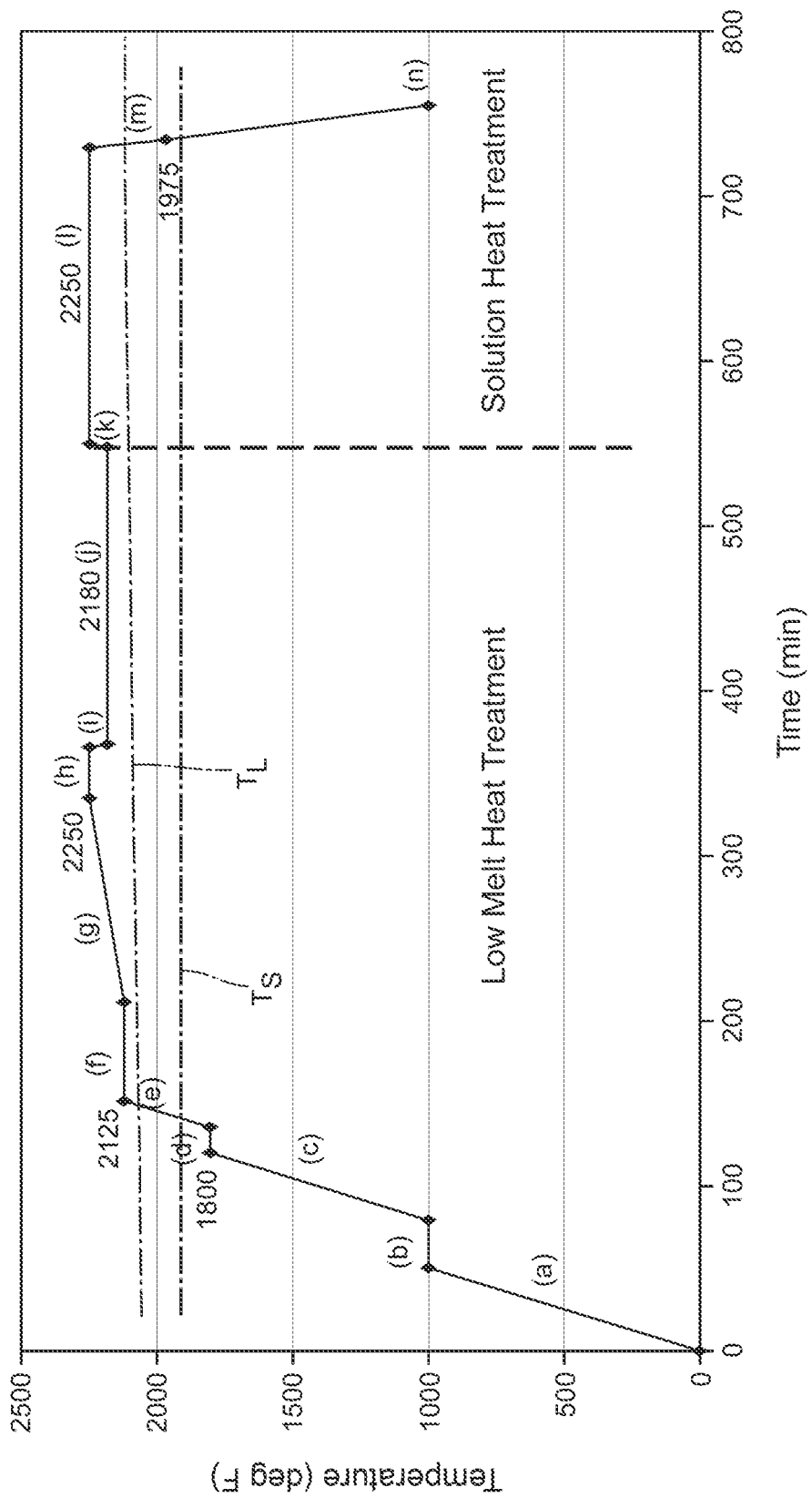
FIG. 4 is a graph illustrating temperatures and time periods for low-melt and solution heat treatments of the process of the present disclosure.

The preforms 30 on the contact surfaces 22A and 22B are then subjected to a heat treatment operation to braze the preforms 30 to the contact surfaces 22A and 22B. In the illustrated embodiment, the heat treatment operation comprises a low-melt heat treatment. Also in the illustrated embodiment, immediately following the low-melt heat treatment is a solution heat treatment. The temperatures set out below for steps (a)-(e), (g), (i), (k), (m) and (n) are oven temperatures. The temperatures set out below for steps (f), (h), (j) and (l) are guaranteed soak temperatures, i.e., temperatures determined by sensors attached to a sample part provided in the oven. An example heat treatment operation, comprising a low-melt heat treatment followed by a solution heat treatment, is illustrated in FIG. 4.

The low-melt heat treatment comprises:
(a) ramping up to 1000° F. at a rate of 20° F./minute;
(b) maintaining the temperature at 1000° F. for 30 minutes;
(c) ramping up to 1800° F. at a rate of 20° F./minute;
(d) maintaining the temperature at 1800° F. for 15 minutes;
(e) ramping up to 2125° F. at a rate of 20° F./minute such that the temperature of the oven is above a solidus temperature $T_S$ and a liquidus temperature $T_L$ of the low-melt material in the preforms 30;

(f) once the temperature of the sample part in the oven reaches 2125° F., maintaining the temperature at 2125° F. for 60 minutes;

(g) ramping up to 2250° F. at a rate of 1° F./minute;

(h) once the temperature of the sample part reaches 2250° F., maintaining the temperature at 2250° F. for 30 minutes;

(i) cooling down to the temperature of 2180° F. at 30° F. per/minute;

(j) once the temperature of the sample part reaches 2180° F., maintaining the temperature at 2180° F. for 180 minutes.

The solution heat treatment comprises:

(k) ramping up to 2250° F. at a rate of 30° F./minute;

(l) once the temperature of the sample part reaches 2250° F., maintaining the temperature at 2250° F. for 130 minutes;

(m) quench with Argon gas from 2250° F. to 1975° F. in five minutes or less, then gas quench from 1975° F. to 1000° F. in 20 minutes or less; and (n) quench with Argon gas from 1000° F. to room temperature in 30 minutes.

During the low-melt heat treatment, the low-melt material, Ni-377-1 in the illustrated embodiment, melts so as to fill the area between the preform 30 and the corresponding contact surface of the tip shroud base portion. Further, the base alloy material, Ni-335-5 in the illustrated embodiment, partially diffuses into the superalloy material defining the contact surfaces 22A and 22B of the base portion 22, thereby raising the remelt temperature of the brazed joint formed between the preform 30 and the tip shroud base portion 22. It is believed that a metallurgical bond, i.e., a diffusion braze, is effected when the low-melt material of the preform 30 melts and the base alloy material of the preform 30 partially diffuses into the material defining the contact surfaces 22A and 22B of the tip shroud base portion 22. The diffusion braze is believed to create an effective bond between the contact surfaces 22A and 22B and the preforms 30 so as to allow the blade 10 to be used in a turbine section of a gas turbine engine.

The solution heat treatment occurs, in the illustrated embodiment, immediately after the low-melt heat treatment to improve overall repair efficiency. However, it is not necessary for the solution heat treatment to immediately follow the low-melt heat treatment. The solution heat treatment is effected to relieve stresses in the blade 10, and reduce hardness and improve ductility of the blade 10.

After solution heat treatment, the preforms 30 and the base portion 22 may be machined to remove any rough edges or points. The preforms 30 and the base portion 22 may then be coated with a conventional hardface metal coating, which coating improves the wear resistance of the blade 10.

It is further contemplated that a braze material paste comprising, for example, the same material from which the preform 30 is formed, may be added to the contact surfaces 22A and 22B prior to locating the preforms 30 on the contact surfaces 22A and 22B so as to fill any voids between the contact surfaces 22A and 22B and the preforms 30 and, hence, improve the quality of the braze between the contact surfaces 22A and 22B and the preforms 30.

It is also contemplated that superalloy material may be welded to the brazed preforms 30 in accordance with a conventional repair process after the blade 10 with the preforms 30 has been in service for an extended period of time such that the preforms 30 become worn.

While the present disclosure discloses repairing contact surfaces 22A and 22B on a tip shroud, it is contemplated that the process of the present invention may be used to couple preforms to other locations of a gas turbine blade in need of repair.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for repairing a damaged portion of a gas turbine blade comprising:
   providing a preform comprising a low-melt alloy material and a base alloy material consisting essentially of materials forming the blade;
   locating the preform on the gas turbine engine blade damaged portion;
   heat treating the preform and the blade such that the preform is brazed to the blade; and
   after heat treating, further comprising welding filler material to the preform.

2. The process of claim 1, wherein said preform comprises about 70 to about 80% by weight base alloy material and about 30 to about 20% by weight low-melt alloy material based on the total weight of the preform prior to heat treating.

3. The process of claim 1, prior to heat treating, further comprising spot-welding the preform to the blade.

4. The process of claim 1, prior to heat treating, further comprising resistance welding the preform to the blade.

5. The process of claim 1, further comprising grinding the damaged portion prior to locating the preform on the damaged portion.

6. The process of claim 1, further comprising machining the preform and the blade after heat treating.

7. The process of claim 1, further comprising adding a braze material to the blade damaged portion prior to locating the preform on the damaged portion.

8. A process for repairing a damaged contact surface of a tip shroud of a gas turbine blade comprising:
   providing a preform comprising a low-melt alloy material and a base alloy material consisting essentially of materials forming the tip shroud;
   locating the preform on the tip shroud contact surface;
   heat treating the preform and the tip shroud such that the preform is brazed to the tip shroud; and
   after heat treating, further comprising welding filler material to the preform.

9. The process of claim 8, wherein the preform comprises about 70 to about 80% by weight base alloy material and about 30 to about 20% by weight low-melt alloy material based on the total weight of the preform prior to welding and heat treating.

10. The process of claim 8, prior to heat treating, further comprising spot-welding the preform to the blade.

11. The process of claim 8, prior to heat treating, further comprising resistance welding the preform to the blade.

12. The process of claim 8, further comprising grinding the damaged section prior to locating the preform on the contact surface.

13. The process of claim 8, further comprising adding a braze material to the tip shroud contact surface prior to locating the preform on the contact surface.

14. The process of claim 8, wherein said heat treating comprises a low-melt heat treatment.

\* \* \* \* \*